United States Patent
Ono et al.

(10) Patent No.: US 6,168,320 B1
(45) Date of Patent: *Jan. 2, 2001

(54) PRINTING APPARATUS AND METHOD, AND FACSIMILE APPARATUS COMPRISING THE APPARATUS

(75) Inventors: Takeshi Ono, Kawasaki; Makoto Kobayashi, Tama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/764,222

(22) Filed: Dec. 13, 1996

(30) Foreign Application Priority Data

Dec. 18, 1995 (JP) ................................................. 7-329285
Nov. 19, 1996 (JP) ................................................. 8-307850

(51) Int. Cl.$^7$ .................................................. B41B 15/00
(52) U.S. Cl. ............................ 395/102; 347/1; 347/20; 347/40; 347/41; 395/101; 395/111
(58) Field of Search .................................. 347/1, 20, 40, 347/41; 395/101, 102, 111

(56) References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,963,882 * | 10/1990 | Hickman .............................. 347/41 |
| 4,967,203 * | 10/1990 | Doan et al. .......................... 347/41 |
| 5,270,728 * | 12/1993 | Lund et al. ............................ 347/5 |
| 5,359,355 * | 10/1994 | Nagoshi et al. ....................... 347/9 |
| 5,477,246 * | 12/1995 | Hirabayashi et al. .............. 347/12 |
| 5,604,597 * | 2/1997 | Imai ................................... 358/296 |
| 5,625,389 * | 4/1997 | Eriksen ............................... 347/41 |
| 5,630,027 * | 5/1997 | Venkateswar ..................... 395/108 |
| 5,696,542 * | 12/1997 | Matsubara ......................... 347/12 |
| 5,719,601 * | 2/1998 | Moore et al. ......................... 347/9 |
| 5,722,781 * | 3/1998 | Yamaguchi ......................... 400/61 |
| 5,790,141 * | 8/1998 | Yamamoto ......................... 347/15 |

FOREIGN PATENT DOCUMENTS

| | | |
|---|---|---|
| 54-56847 | 5/1979 | (JP) . |
| 59-123670 | 7/1984 | (JP) . |
| 59-138461 | 8/1984 | (JP) . |
| 60-71260 | 4/1985 | (JP) . |

* cited by examiner

Primary Examiner—Leo H. Boudreau
Assistant Examiner—Gregory Desire
(74) Attorney, Agent, or Firm—Fitzpatrick, Cella, Harper & Scinto

(57) ABSTRACT

The number of scans of a printing head is controlled so that printing is completed by a smaller number of scans than the predetermined number of scans on printing regions by the first and last scans upon printing on the printing medium by the printing head. In a facsimile apparatus having the printing apparatus, additional information generated by an internal character generator of the facsimile apparatus is transferred to be printed in the first or last scan of the printing head upon outputting the received image data, so that printing is completed by a smaller number of scans than the predetermined number of scans.

22 Claims, 10 Drawing Sheets

PRINTING APPARATUS AND METHOD, AND FACSIMILE APPARATUS COMPRISING THE APPARATUS

BACKGROUND OF THE INVENTION

The present invention relates to a printing apparatus and method and, more particularly, to a printing apparatus for performing printing by scanning a region having a predetermined width once or a plurality of number of times using a printing head having a printing element array having the predetermined width in the feed direction of a printing medium, and a facsimile apparatus comprising the apparatus.

As a conventional printing apparatus, an ink-jet printing apparatus that performs printing by ejecting ink onto a printing medium to form an image is known. In general, in this printing method, a printing head constituted by arranging a plurality of nozzles, serving as a printing element array, in the feed direction of a printing medium to have a predetermined width is scanned in a direction (main scanning direction) perpendicular to the nozzle array, and the printing medium is fed in a direction (sub-scanning direction) perpendicular to the main scanning direction, thus performing printing on the printing medium. As described above, this printing method for completing printing corresponding to the printing width of the printing head by one scan without dividing the nozzle array of the printing head into a plurality of blocks will be referred to as a one-pass printing method.

As an application of this printing method, multipass printing is known. In this printing method, the nozzle array is divided into n nozzle regions (n is an integer equal to or larger than 2), and printing corresponding to the printing width of the printing head is completed by n scans using n different nozzle regions with respect to an identical printing region. More specifically, in the first scan, printing is performed by ejecting ink from the nozzles of the printing head and scanning the printing head in the main scanning direction. In the next scan, the printing medium is fed by a width 1/n the nozzle array in the sub-scanning direction, and thereafter, printing is performed by further performing ink ejection onto the 1/n region that has been subjected to the ink ejection in the previous scan, and similarly scanning the printing head. Furthermore, in the next scan, the printing medium is fed by a width 1/n the nozzle array in the sub-scanning direction, and thereafter, printing is performed by further performing ink ejection onto the 1/n region that has been subjected to the ink ejection in the two previous scans, and similarly scanning the printing head. By repeating the above-mentioned operation n times, printing corresponding to the printing width to be printed in one scan in one-pass printing is completed. At this time, image data obtained by processing (e.g., masking specific information of) the same image data to be used in printing in one-pass printing for multi-pass printing is used. With multi-pass printing, for example, the image quality of a gradation image can be improved.

However, in the case of, e.g., the conventional multi-pass recording in one recording apparatus, some nozzles are not used in actual printing on the first portion (the portion to be printed in the first scan) and the last portion (the portion to be printed in the last scan), resulting in an idle scanning region. For example, when n-pass printing (n is an integer equal to or larger than 2) is to be performed, each of the first and last scans upon printing the first and last portions of the printing region uses only a region corresponding to 1/n nozzles of the printing head, and the remaining (n−1)/n nozzle region scans a blank printing region that becomes an idle scanning region. Furthermore, the n-pass printing method requires a printing time n times that required for one-pass printing.

On the other hand, the scans for the first and last portions of the printing region often correspond to the leading and trailing end portions of a cut printing paper sheet, and the blank printing regions require extra margins on the printing start and end portions on the printing medium, resulting in a narrow printable range. Especially, as the printing head has a larger printing width, and the printing range for one scan increases, the blank printing region becomes broader, and consequently, the printable range is further narrowed.

In order to assure a broad printable range, a method of adjusting the position of the printing medium with respect to the printing head may be used. However, with this method, the printing medium must be moved and held by, e.g., rollers so that the leading end of the printing medium is located at the middle of the printing head on the leading end portion of the printing medium, and the trailing end of the printing medium is stopped at the middle of the printing head on the trailing end portion of the printing medium. With such apparatus arrangement, since the printing medium must be firmly held while assuring the moving space of the printing head, the mechanism is complicated considerably. When the mechanism for holding the printing medium is arranged in the apparatus, a large space is required in the apparatus (especially, in the holding portion of the printing medium), and consequently, the distance between the printing medium and the printing head undesirably becomes large.

In particular, when the printing head is an ink-jet printing head, if the distance between the printing medium and the printing head is large, the ink ejected from the printing head cannot land at desired positions on the printing medium, or the ink lands on the printing medium while being sprayed consequently, largely influencing on the image quality.

Also, it is mechanically difficult to hold the leading and trailing end portions of the printing medium, and the printing head may contact the leading or trailing end of a printing paper sheet, thus causing ink contamination or stains on the printing medium.

Furthermore, in the case of the printing apparatus used in printing of a facsimile apparatus, the leading end portion of the printing medium often has a margin or header information such as the transmission date, page, ID, and the like as a binary image to be added by the transmitting side, and the necessity of multi-pass printing such data from the leading end of the printing medium is low. Moreover, the trailing end portion of the printing medium often also has a footer mark or footer information such as time as a binary image, and the necessity of multi-pass printing is low in that portion.

SUMMARY OF THE INVENTION

The present invention has been made in consideration of the above-mentioned problems, and has as its object to provide a printing apparatus and method, which can decrease the printing time loss, and a facsimile apparatus comprising the printing apparatus.

It is another object of the present invention to provide a printing apparatus and method, which can broaden the effective printing region to be printed by a printing head, and execute optimal printing corresponding to input image data, and a facsimile apparatus comprising the printing apparatus.

In order to achieve the above objects, a printing apparatus according to the present invention comprises the following arrangement.

That is, there is provided a printing apparatus for printing an image on a printing medium using a printing head having a printing element array with a predetermined width in a feed direction of the printing medium, comprising:

printing means for performing printing by scanning a region having the predetermined width on the printing medium a predetermined number of times (n≧2) using the printing head; and control means for controlling the printing means so that the scanned region includes a printing region in which printing is completed by a smaller number of scans of the printing head than the predetermined number of times, upon printing in at least a first or last scan of the printing head.

In order to achieve the above object, a facsimile apparatus according to the present invention comprises the following arrangement.

That is, there is provided a facsimile apparatus which comprises a printing apparatus of claim 1, comprising:

communication means for transmitting/receiving image data onto/from a communication line;

generation means for generating additional information to be added to the printing medium upon outputting the received image data; and transfer means for transferring the additional information to the printing head so as to print the additional information in the first or last scan of the printing operation on the printing medium by the printing head.

In order to achieve the above object, a printing apparatus according to the present invention comprises the following arrangement.

That is, there is provided a printing apparatus which is connected to a plurality of external apparatuses and prints an image on a printing medium on the basis of image data input from one of the plurality of external apparatuses, comprising:

printing means for performing printing, using a printing head having a printing element array with a predetermined width in a feed direction of the printing medium, by scanning a region having the predetermined width on the printing medium a predetermined number of times (n≧2);

discrimination means for discriminating the external apparatus as a source of the input image data; and control means for controlling the printing means on the basis of a discrimination result of the discrimination means so that the scanned region includes a printing region in which printing is completed by a smaller number of scans of the printing head than the predetermined number of times, upon printing in at least a first or last scan of the printing head.

In order to achieve the above object, a method of controlling a printing apparatus according to the present invention comprises the following arrangement.

That is, there is provided a control method for a printing apparatus for printing an image on a printing medium using a printing head having a printing element array with a predetermined width in a feed direction of the printing medium, comprising:

the printing step of performing printing by scanning a region having the predetermined width on the printing medium a predetermined number of times (n≧2) using the printing head; and the control step of controlling the printing step so that the scanned region includes a printing region in which printing is completed by a smaller number of scans of the printing head than the predetermined number of times, upon printing in at least a first or last scan of the printing head.

In order to achieve the above object, a method of controlling a printing apparatus according to the present invention comprises the following arrangement.

That is, there is provided a control method for a printing apparatus which is connected to a plurality of external apparatuses and prints an image on a printing medium on the basis of image data input from one of the plurality of external apparatuses, comprising:

the printing step of performing printing, using a printing head having a printing element array with a predetermined width in a feed direction of the printing medium, by scanning a region having the predetermined width on the printing medium a predetermined number of times (n≧2);

the discrimination step of discriminating the external apparatus as a source of the input image data; and the control step of controlling the printing step on the basis of a discrimination result in the discrimination step so that the scanned region includes a printing region in which printing is completed by a smaller number of scans of the printing head than the predetermined number of times, upon printing in at least a first or last scan of the printing head.

As described above, according to the present invention, since printing on the printing regions to be printed by at least the first and last scans in the printing operation on a printing medium using a printing head is completed by a smaller number of scans than the normal number of scans, the printing time loss can be decreased, and the effective printing region on the printing medium can be increased. Hence, the printing medium can be effectively used.

Since the printing mode corresponding to an apparatus as the input source of image data is automatically selected in correspondence with the input image data, optimal printing corresponding to the type of apparatus as an output source of image data can be realized without any load on the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

The present invention will be described in detail hereinafter with reference to the illustrated embodiments.

Figure 1:
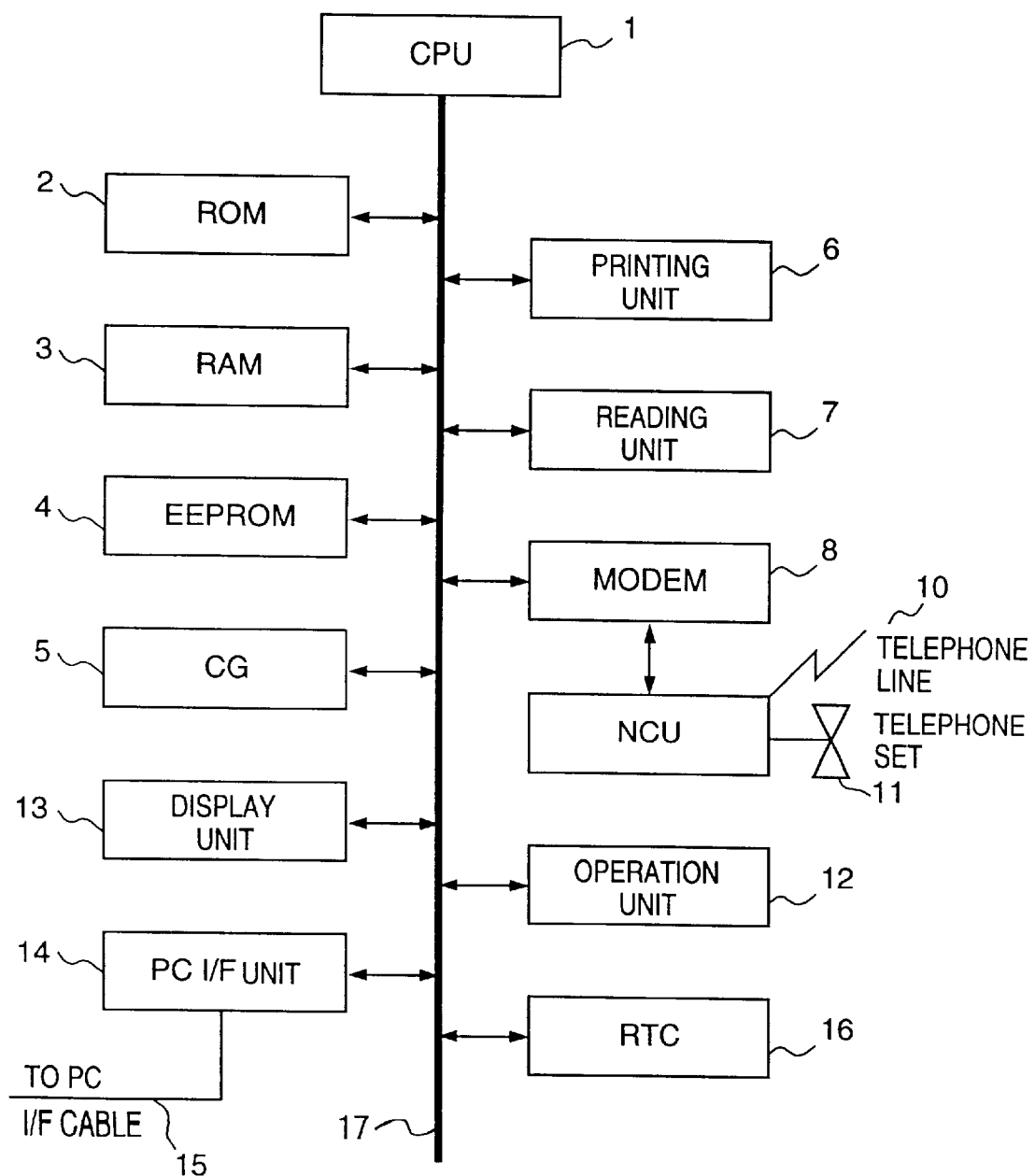
FIG. 1 is a block diagram showing the arrangement of a facsimile apparatus according to an embodiment of the present invention.

FIG. 1 is a block diagram showing the arrangement of a facsimile apparatus of this embodiment.

Referring to FIG. 1, reference numeral 1 denotes a CPU which comprises a microprocessor and the like, and controls a RAM 3, an EEPROM 4, a character generator (CG) 5, a printing unit 6, a reading unit 7, a modem (MODEM) 8, a network control unit (NCU) 9, an operation unit 12, and a display unit 13 in accordance with programs stored in a ROM 2.

Reference numeral 3 denotes a RAM which stores image data read by the reading unit 7 or image data to be printed by the printing unit 6, and also stores image data to be output onto a telephone line 10 via the NCU 9 after it is modulated by the modem 8. The RAM 3 also stores image data obtained by demodulating an analog waveform signal input from the telephone line 10 via the NCU 9 and the modem 8. Furthermore, the RAM 3 stores reception data supplied from an interface unit (PC I/F unit) 14 with a personal computer (PC).

Reference numeral 4 denotes an EEPROM which can reliably store data to be preserved even when the power switch of the facsimile apparatus is turned off.

Reference numeral 5 denotes a character generator (CG) which is a ROM that stores character fonts, and outputs a character corresponding to a predetermined code as needed under the control of the CPU 1.

Reference numeral 6 denotes a printing unit which is constituted by a DMA controller (not shown), an ink-jet printer, a control signal generation circuit (not shown), and the like, and reads out printing data stored in the RAM 3 and prints it out as a hard copy under the control of the CPU 1.

Reference numeral 7 denotes a reading unit which is constituted by a DMA controller (not shown), an image processing IC (not shown), an image sensor (not shown), a sensor control signal generation circuit (not shown), and the like, and sequentially supplies image data read by the image sensor to the RAM 3 under the control of the CPU 1. Note that the original loading state with respect to the reading unit 7 can be detected by an original sensor (not shown) arranged in the feeding path of an original, and an original detection signal is input to the CPU 1.

Reference numeral 8 denotes a modem which complies with the G3 standards, and incorporates a control signal generation circuit (not shown), and the like. The modem 8 modulates transmission data stored in the RAM 3 and outputs it onto the telephone line 10 via the NCU 9 under the control of the CPU 1.

Reference numeral 9 denotes an NCU, which selectively connects the telephone line to the modem 8 or a telephone set 11 under the control of the CPU 1. The NCU 9 has a circuit (not shown) for detecting a ringing signal (CI).

Reference numeral 11 denotes a telephone set, which is integrated on the facsimile apparatus main body. More specifically, the telephone set 11 is constituted by a handset, a speech network, a dialer, a ten-key pad or a one-touch key pad, and the like.

Reference numeral 12 denotes an operation unit which is constituted by a key for starting image transmission/reception, and the like, a mode selection key for designating the operation mode such as a fine/standard mode, a manual/automatic reception mode, and the like in the transmission/reception mode, a ten-key pad for dialing, and the like. Note that the CPU 1 detects the pressing states of these keys, and controls the respective units in correspondence with the detected states.

Reference numeral 13 denotes a display unit which comprises a liquid crystal display which performs a 16-digit display, and displays predetermined characters and the like under the control of the CPU 1.

Reference numeral 14 denotes an interface unit (PC I/F unit), which receives image data supplied from an external computer apparatus (PC) via an interface cable 15, and is constituted by a connector, a buffer, and the like.

Reference numeral 16 denotes a real-time clock (RTC) for measuring time.

Reference numeral 17 denotes a CPU bus for interconnecting the above-mentioned constituting elements.

Figure 2:
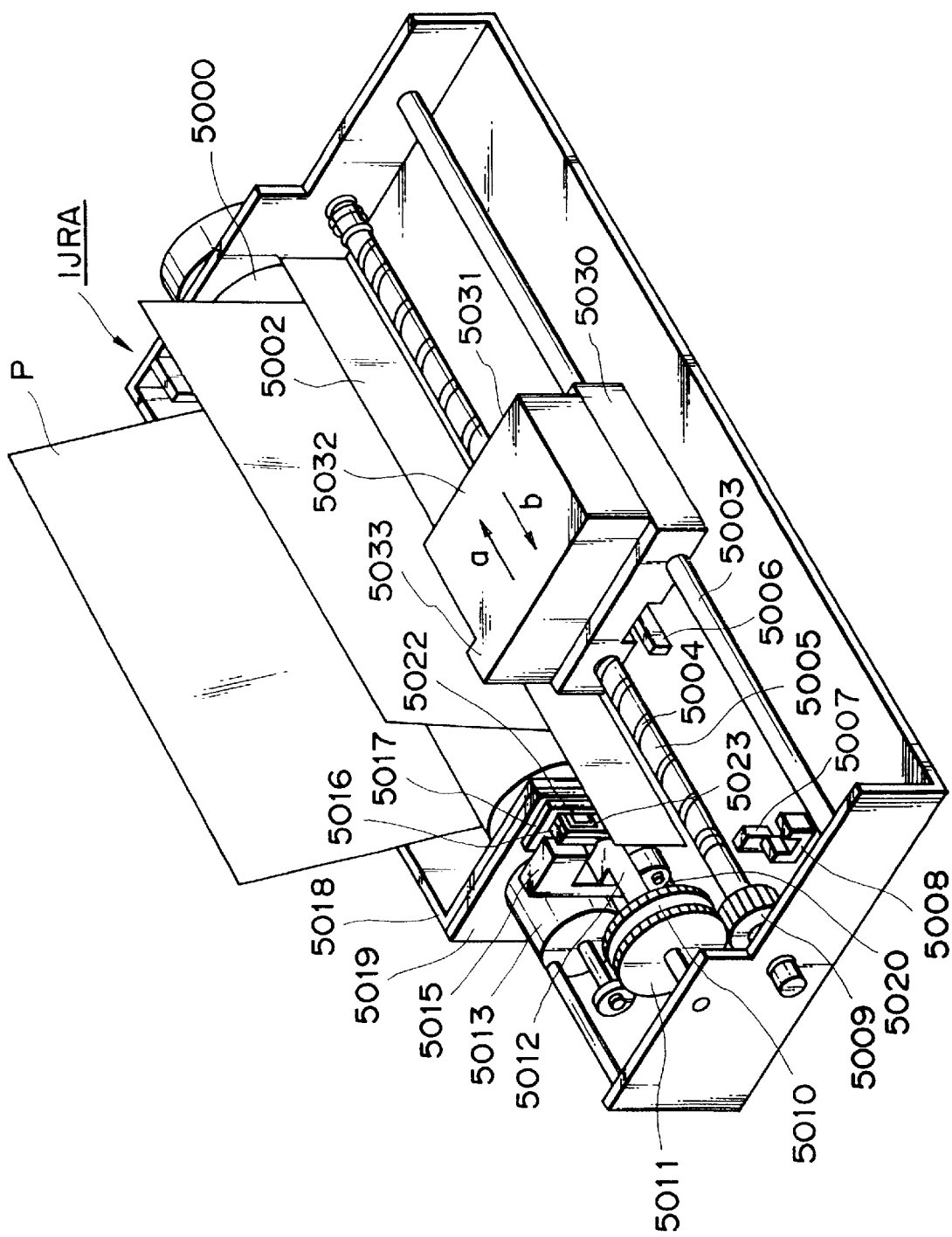
FIG. 2 is a schematic perspective view showing the arrangement of a printing unit of the embodiment of the present invention.

FIG. 2 is a schematic perspective view showing the arrangement of the printing unit of this embodiment.

Referring to FIG. 2, a carriage HC engages with a spiral groove 5004 of a lead screw 5005, which rotates via driving force transmission gears 5011 and 5009 in cooperation with the forward/reverse rotation of a driving motor 5013, and has a pin (not shown). The carriage HC is reciprocally moved in the directions of arrows a and b. An integrated type ink-jet cartridge IJC that incorporates a printing head IJH and an ink tank IT is carried on the carriage HC. In this embodiment, the ink-jet cartridge IJC is constituted by integrating the printing head IJH which ejects ink from ejection orifices by causing changes in state of ink using heat energy, and the ink tank IT, and is a disposable type cartridge, which is detachable from the carriage HC.

Reference numeral 5002 denotes a paper pressing plate which presses a printing paper sheet P against a platen 5000 along the moving direction of the carriage HC. Reference numerals 5007 and 5008 denote photocouplers which serve as a home position detector for confirming the presence of a lever 5006 of the carriage HC in the corresponding region, and performing, e.g., the switching operation of the rotation direction of the motor 5013. Upon feeding the printing paper sheet P, the rotation of the motor 5013 is transmitted to the platen 5000 via a transmission gear 5010, and the printing paper sheet P is fed in a direction nearly perpendicular to the moving direction of the carriage HC upon rotation of the platen 5000. Reference numeral 5016 denotes a member for supporting a cap member 5022 that caps the front surface of the printing head IJH. Reference numeral 5015 denotes a suction member that performs suction restoration of the printing head IJH of the cap member 5022 via an intra-cap opening 5023.

Reference numeral 5017 denotes a cleaning blade; and 5019, a member which allows the blade 5017 to be movable in the back-and-forth direction. These members are supported by a main body support plate 5018. The blade 5017 is not limited to this specific one, but a known cleaning blade can be applied to this embodiment, needless to say. Reference numeral 5012 denotes a lever for initiating suction. The lever 5012 moves upon movement of a cam 5020 which engages with the carriage HC, and its movement is controlled by a known transmission mechanism such as clutch switching by the driving force from a driving motor. These capping, cleaning, and suction recovery operations are performed at their corresponding positions upon operation of the lead screw 5005 when the carriage HC arrives the region on the home position side. However, the present invention is not limited to a specific arrangement, as long as desired operations are performed at known timings.

Figure 3A:
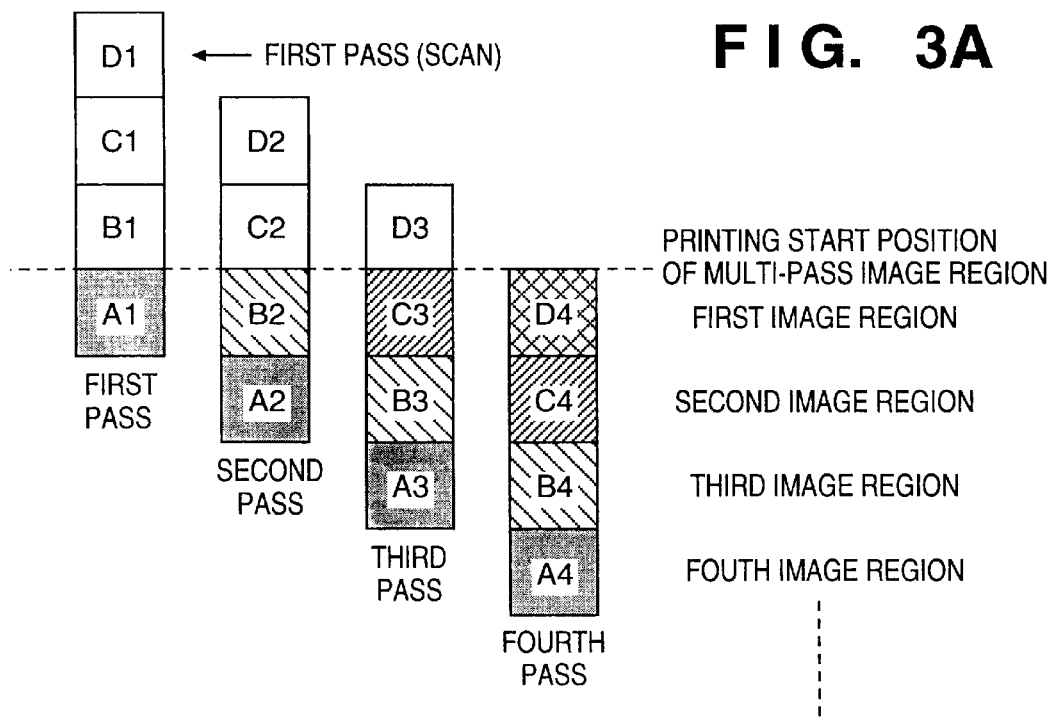
FIG. 3A is a view showing the printing positions at the printing start position of the embodiment of the present invention.
Figure 3B:
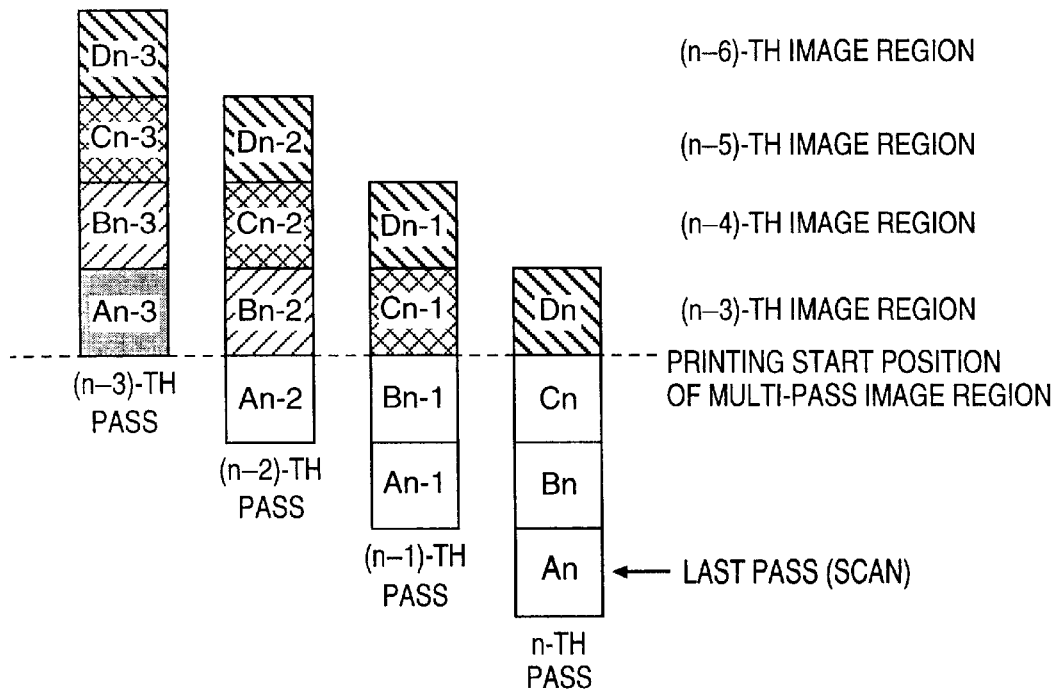
FIG. 3B is a view showing the printing positions at the printing end position of the embodiment of the present invention.

In this embodiment, the four-pass printing mode to be described below with reference to FIGS. 3A and 3B is executed using the printing unit with the above-mentioned mechanism.

Note that the nozzle array of the printing head IJH includes 64 nozzles.

FIG. 3A shows the recording positions at the recording start position, and FIG. 3B shows the recording positions at the recording end position.

The characteristic printing operations of this embodiment at the recording start and end positions will be explained below with reference to FIGS. 3A and 3B. The first image region on a printing medium, which is printed by a ¼ nozzle region (corresponding to a region A1 in FIG. 3A) of the nozzle array of the printing head IJH in the first pass at the beginning of printing, is printed in the four-pass printing mode, and image regions on the printing medium, which are printed by the remaining ¾ nozzle region (corresponding to regions B1, C1, and D1 in FIG. 3A) of the nozzle array are printed in the one-pass printing mode. With this control, the ¾ nozzle regions (corresponding to the regions B1, C1, and D1 in FIG. 3A) of the nozzle array, which are not used in printing in the first pass at the beginning of printing in the conventional method, are used for performing the one-pass image printing operation, thereby broadening the printing region printed on the printing medium by the printing head. Similarly, at the printing end position, image regions An, Bn, and Cn in FIG. 3B are printed in the one-pass printing mode to obtain the same effect as described above.

On the other hand, no printing need be performed in the first pass on image regions corresponding to the nozzle regions B1, C1, and D1, and printing may be performed in the second pass on image regions corresponding to nozzle regions C2 and D2 in the one-pass printing mode. However, it is most efficient to print in the one-pass printing mode in the first pass at the beginning of printing.

The above description exemplifies the four-pass printing mode. As will be described below, the number of scans can be generally set to be n. More specifically, in the n-pass printing mode, in the first pass (scan) at the beginning of printing on the printing medium by the printing head, printing is performed on corresponding image regions on the printing medium using an (n−1)/n region of the nozzle array of the printing head in the one-pass printing mode, and printing is performed on a corresponding image region on the printing medium using the remaining 1/n nozzle region in the n-pass printing mode. Likewise, the same processing is performed in a pass at the end of printing.

Figure 4:
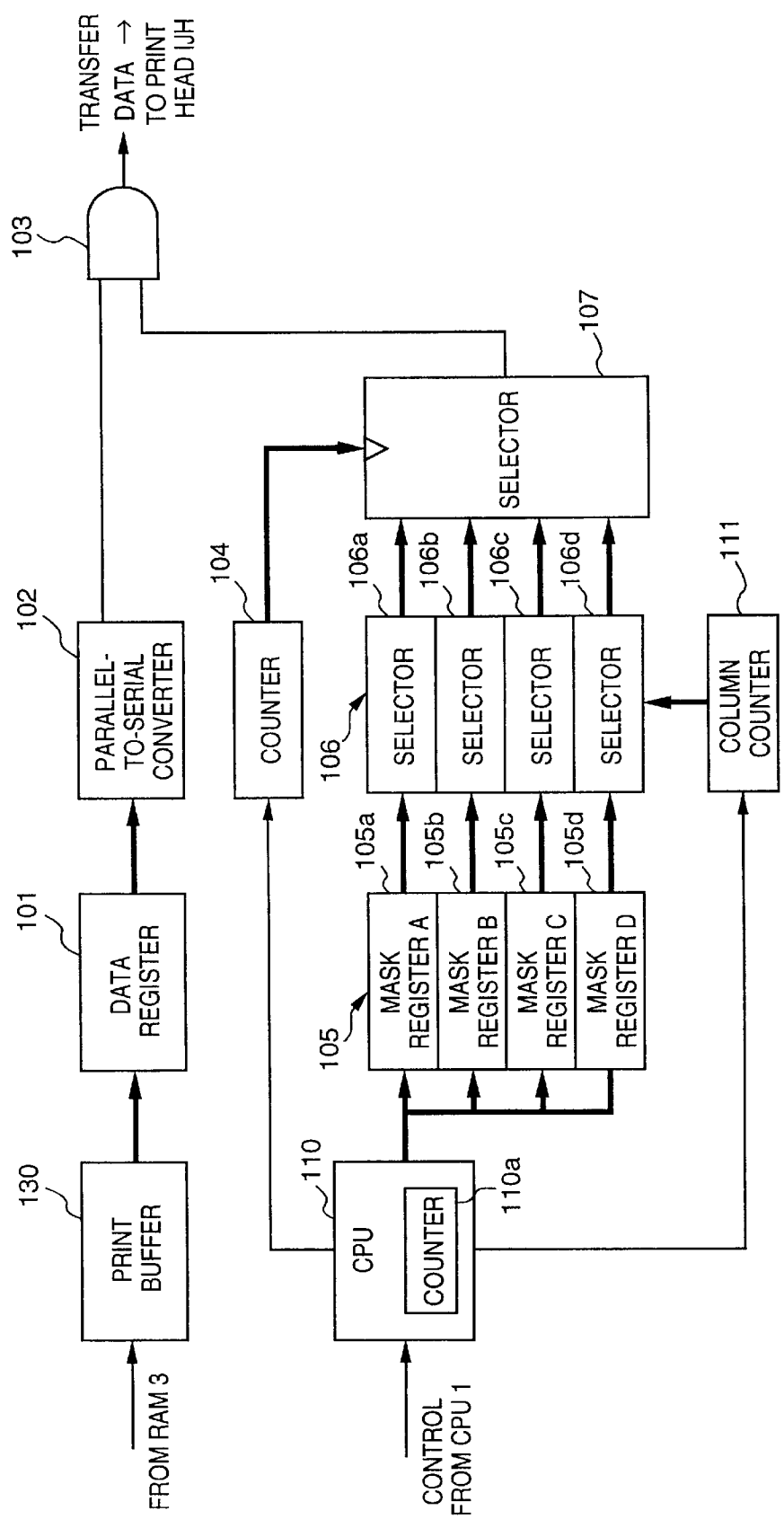
FIG. 4 is a block diagram showing the arrangement of a data transfer circuit built in the printing unit of the embodiment of the present invention.

In this embodiment, such processing is executed using a data transfer circuit shown in FIG. 4. This data transfer circuit is built in the printing unit 6 shown in FIG. 2, receives the received image or header/footer data generated by the CPU 1 from the RAM 3, and controls data transfer to the printing head IJH.

FIG. 4 is a block diagram showing the arrangement of a data transfer circuit built in the printing unit of this embodiment.

Note that nozzle numbers x1, x2, ..., x63, x64 are assigned to 64 nozzles of the printing head IJH, and 1-bit image data is transferred to one nozzle of the nozzle array.

Referring to FIG. 4, reference numeral 130 denotes a print buffer for receiving image data for at least 64 lines via the CPU bus 17, and temporarily storing the received data. Reference numeral 101 denotes a data register for simultaneously reading out image data of (one dot in the main scanning direction)×(64 lines in the sub-scanning direction) from the print buffer 130, and temporarily storing the readout data. Reference numeral 102 denotes a parallel-to-serial (P/S) converter for converting the data stored in the data register 101 into serial data bit by bit. Reference numeral 103 denotes an AND gate for logically ANDing image data transferred from the P/S converter 102 and a mask pattern selected by a selector 107 (to be described below).

Reference numeral 104 denotes a counter for counting the number of bits of the image data transferred to the P/S converter 102 bit by bit. When the counter 104 has counted 64 bits, it is reset and begins to count 64 bits again. The count value output from the counter 104 corresponds to one bit of the image data output from the P/S converter 102, i.e., the nozzle number of the recording head IJH to which the bit is transferred via the AND gate 103. For example, when the count value of the counter 104 is "1", the nozzle number is x1; when the count value is "2", the nozzle number is x2. In this manner, the image data is output from the P/S converter 102. Furthermore, every time the counter 104 counts one bit of image data transferred to the P/S converter 102, it outputs the count value as a control signal of the selector 107. The selector 107 selects a mask that masks the image data in correspondence with the count value.

Reference numeral 105 denotes a mask register, which is connected to a CPU 110 and stores mask patterns. The mask register 105 is constituted by four mask registers A 105*a*, B 105*b*, C 105*c*, and D 105*d* in correspondence with regions Ai, Bi, Ci, and Di (i=1, ..., n) shown in FIGS. 3A and 3B, and stores a mask pattern for 16 lines written by the CPU 110. Note that the mask pattern is designed so that printing on, e.g., the first image region shown in FIGS. 3A and 3B is completed when the mask processing of all the mask patterns stored in the four mask registers A 105*a*, B 105*b*, C 105*c*, and D 105*d* is performed.

Reference numeral 106 denotes a selector for selecting a mask required for printing in units of scans of the printing head IJH from the mask register 105. The selector 106 has four selectors 106*a* to 106*d* for selecting mask data for 16 lines in correspondence with the mask registers A 105*a* to D 105*d*. The selectors 106*a* to 106*d* select the mask patterns stored in the mask registers A 105*a* to D 105*d* or a pattern of all "1"s in accordance with a control signal from a column counter 111 (to be described later). Reference numeral 107 denotes a selector for selecting mask data required for the respective nozzle array regions of the printing head IJH from those selected by the selector 106. The selector 107 sequentially selects the selectors 106*a* to 106*d* in accordance with the count value (CNT) from the counter 104. More specifically, the selector 107 selects the selector 106*d* when $1 \leq CNT \leq 16$; the selector 106c when $17 \leq CNT \leq 32$; the selector 106b when $33 \leq CNT \leq 48$; and the selector 106a when $49 \leq CNT \leq 64$.

Reference numeral 110 denotes a CPU for performing various control operations in the data transfer circuit under the control of the CPU 1. The CPU 110 comprises a counter 110a for counting the number (CCNT) of scans of the printing head IJH.

Reference numeral 111 denotes a column counter for counting the column position of the mask pattern. The column counter 111 generates a control signal of the selector 106, and outputs a control signal for selecting the mask to be used in each scan of the printing head in correspondence with the count value of the column position.

Note that the mask is to be logically ANDed with image data in units of passes so as not to repetitively print identical data when the respective passes use different nozzle regions in the multi-pass printing mode. For example, in the n-pass printing mode, n masks used for an identical image region are designed to complement to each other.

Figure 5A:
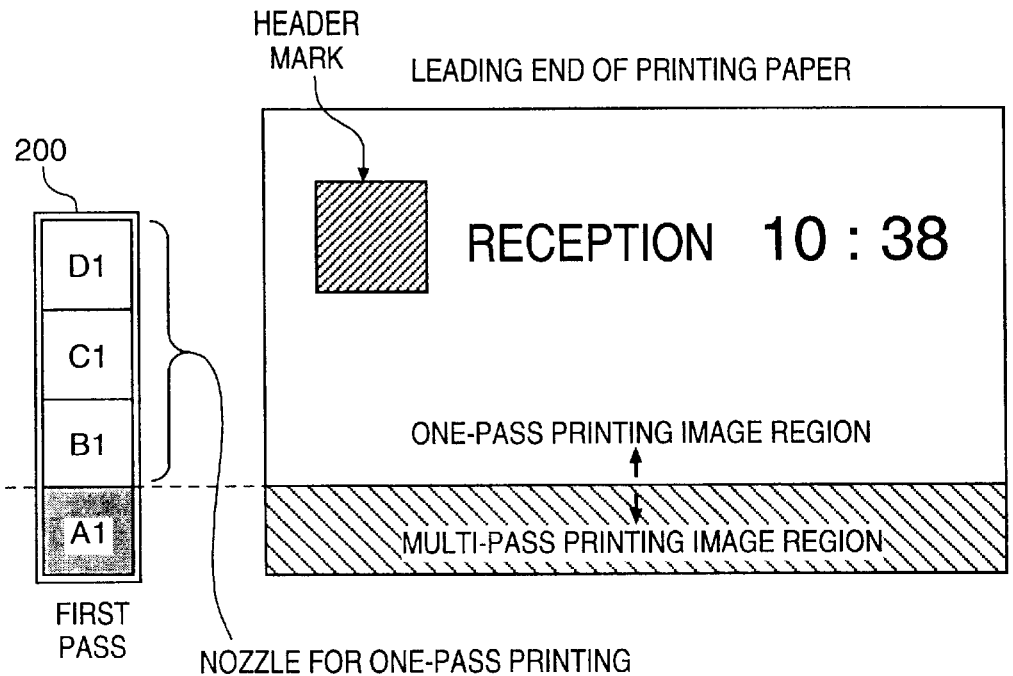
FIG. 5A is a view showing the printing region at the beginning of printing of the embodiment of the present invention.
Figure 5B:
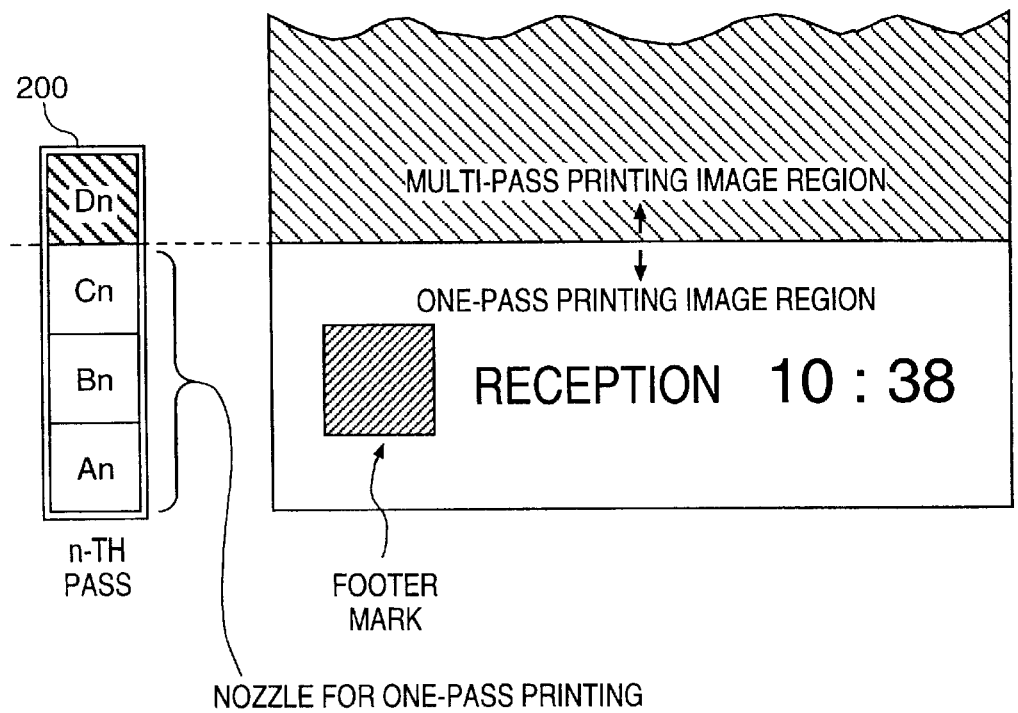
FIG. 5B is a view showing the printing region at the end of printing of the embodiment shown in FIG. 1.

FIG. 5A shows the image region at the beginning of printing in this embodiment, and FIG. 5B shows the image region at the end of printing.

FIG. 5A shows a case wherein a nozzle region 200 of the printing head IJH prints the first pass at the beginning of printing, and FIG. 5B shows a case wherein the nozzle region 200 of the printing head IJH prints the last pass at the end of printing. As shown in FIGS. 5A and 5B, four-pass printing is performed using a nozzle region A1 at the leading end portion of a printing paper sheet, and a nozzle region Dn at the trailing end portion of the printing paper sheet. On the other hand, one-pass printing is performed using nozzle regions B1, C1, and D1 at the leading end portion, and using nozzle regions An, Bn, and Cn at the trailing end portion. FIGS. 5A and 5B exemplify a case wherein header and footer marks used for detecting the presence/absence of ink, and the reception time are printed as header information on the leading end portion and footer information on the trailing end portion in the one-pass printing mode.

The printing operation of this embodiment, which performs printing combining the one- and four-pass printing modes using the apparatus with the above arrangement will be described below with reference to FIGS. 3A and 3B, the data transfer circuit shown in FIG. 4, the printing examples shown in FIGS. 5A and 5B, and the flow charts shown in FIGS. 6, 7, 8, and 9.

Note that printing is completed in the n-th pass, header information is printed in the first pass, and footer information is printed in the n-th pass.

In step S2, image data for 64 lines (1st to 48th lines correspond to header information, and 49th to 64th lines correspond to image data) are transferred to the print buffer 130, and are then transferred to the P/S converter 102 via the data register 101. At this time, CCNT=1 is set in the counter 110a as the initial value of the number of scans of the printing head IJH.

In step S4, in the first pass at the beginning of printing, header information is printed using the ¾ nozzle region (corresponding to image regions B1, C1, and D1 in FIG. 3A) of the nozzle array of the printing head IJH in the one-pass printing mode. When the count value of the counter 110a is CCNT=1, the selector 106a selects the mask pattern in the mask register A 105a, and outputs a pattern corresponding to the column indicated by the count value of the column counter 111. In this case, the selectors 106b to 106d select patterns of all "1"s. More specifically, while the count value of the counter 104 ranges from 1 to 48, the selectors 106d to 106b that select patterns of all "1"s are sequentially selected to always input "1" to the terminal, on the selector 107 side, of the AND gate 103.

Therefore, the AND gate 103 logically ANDs one bit of image data transferred from the P/S converter 102 and "1" input at its gate on the selector 107 side every time the counter 104 counts one bit. With this processing, image data used in the one-pass printing mode are sequentially transferred to the printing head IJH without being masked.

On the other hand, when the count value of the counter 104 ranges from 49 to 64, the selector 107 selects the selector 106a. More specifically, the selector 107 selects the mask pattern stored in the mask register A 105a, and outputs it to the AND gate 103. With this processing, the ¼ nozzle region (corresponding to the image region A1 in FIG. 3A) of the nozzle array of the printing head IJH is masked to perform four-pass printing.

More specifically, the AND gate 103 logically ANDs the respective bits of image data transferred from the P/S converter 102 and the selected mask pattern, and image data used in the four-pass printing mode are sequentially transferred to the printing head IJH. The column counter 111 increments its contents by 1. As a consequence, image data required for recording an image for one column of the image to be printed by one scan of the printing head IJH are stored in a memory of the printing head IJH, and printing is executed. This operation is repetitively executed until the count value of the column counter 111 reaches a value corresponding to the number of columns for one scan, i.e., for one scan, thus completing printing of the first pass.

It is checked in step S6 if printing in the first pass is completed. If it is determined that printing is completed (YES in step S6), the printing head IJH returns to its home position. On the other hand, if printing is not completed yet (NO in step S6), the flow returns to step S4.

In step S8, image data are transferred to the print buffer 130, and are then transferred to the P/S converter 102 via the data register 101.

In step S8, in the second to fourth passes, printing upon transition from the one-pass printing mode to the four-pass printing mode is performed. The processing at that time will be described in detail below with reference to the flow chart shown in FIG. 8.

Figure 8:
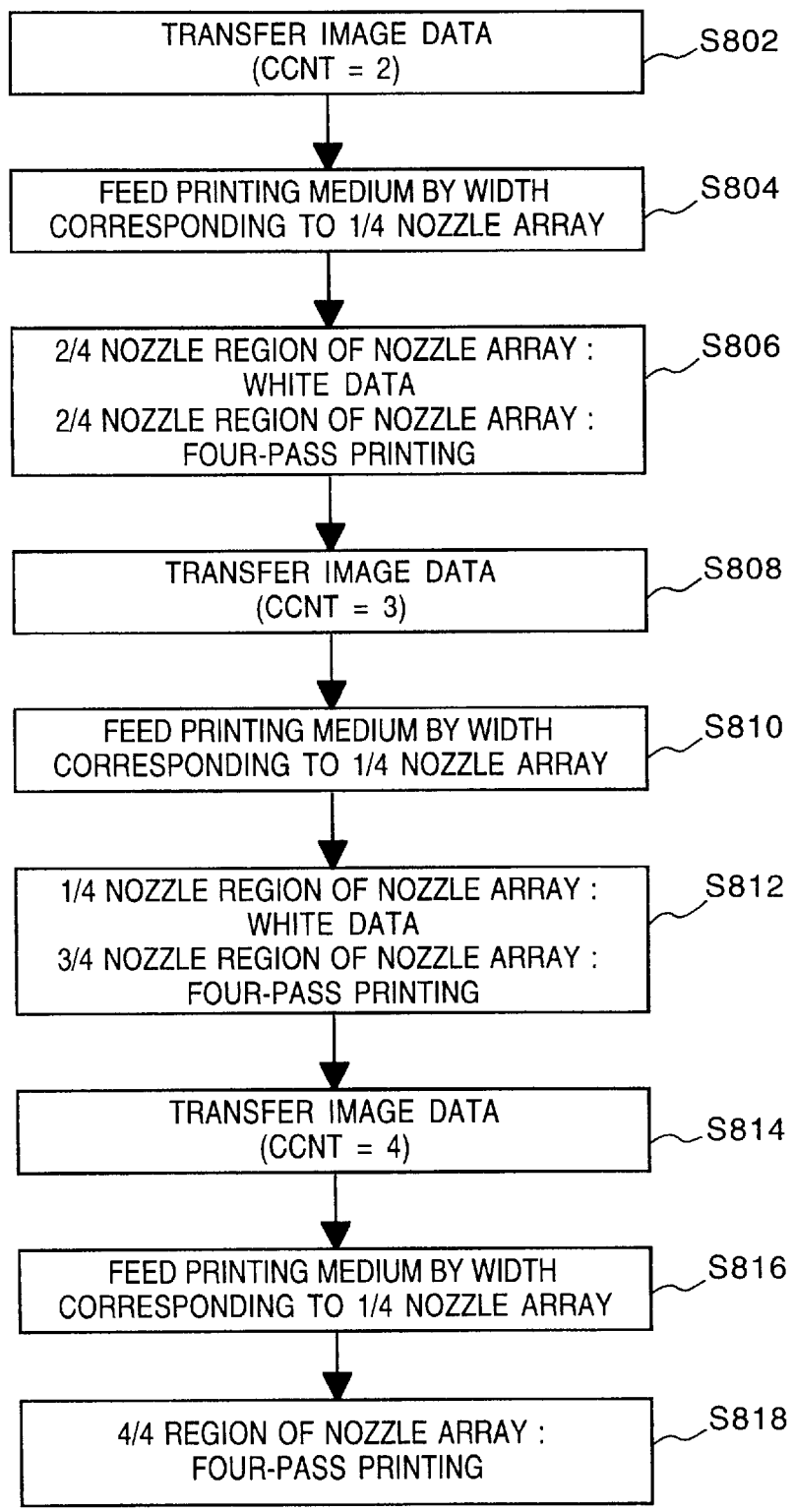
FIG. 8 is a flow chart showing the transition from the one-pass printing mode to the four-pass printing mode in the embodiment of the present invention.

FIG. 8 is a flow chart showing the processing flow upon transition from the one-pass printing mode to the four-pass printing mode in this embodiment.

In step S802, image data for 64 lines (the 1st to 32nd lines correspond to "0" data, the 33rd to 48 lines correspond to the image data used in the first pass, and the 49th to 64th lines correspond to new image data) are transferred to the print buffer 130, and are then transferred to the P/S converter 102 via the data register 101. At this time, CCNT=2 is set in the counter 110a as the number of scans of the printing head IJH.

In step S804, the printing medium is fed from the printing position in the first pass in the sub-scanning direction by a width corresponding to the ¼ region of the nozzle array.

In step S806, printing in the second pass is performed. The ⅔ nozzle region (corresponding to image regions C2 and D2 in FIG. 3A) of the nozzle array prints "0" data. When the count value of the counter 110a is CCNT=2, the selector 106a selects the mask pattern in the mask register A 105a, the selector 106b selects the mask pattern in the mask register B 105b, and the selectors 106c and 106d select patterns of all "1"s.

More specifically, while the count value of the counter 104 ranges from 1 to 32, the selectors 106d and 106c that select the patterns of all "1"s are sequentially selected. The AND gate 103 logically ANDs one bit of image data transferred from the P/S converter 102 and "1" input at its gate on the selector 107 side every time the counter 104 counts one bit. With this processing, image data having a pattern of "0"s are sequentially transferred to the printing head IJH.

On the other hand, while the count value of the counter 104 ranges from 33 to 48, the selector 107 selects the selector 106b. More specifically, the selector 107 selects the mask pattern in the mask register B 105b and outputs it to the AND gate 103. With this processing, the next ¼ nozzle region (corresponding to the image region B2 in FIG. 3A) is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Furthermore, while the count value of the counter 104 ranges from 49 to 64, the selector 107 selects the selector 106a. That is, the selector 107 selects the mask pattern in the mask register A 105a, and outputs it to the AND gate 103. With this processing, the remaining ¼ nozzle region (corresponding to the image region A2 in FIG. 3A) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH. As a consequence, the image data required for printing an image for one column by the printing head IJH are stored in the printing head IJH, and printing is executed. This operation is repetitively executed until the count value of the column counter 111 reaches a value corresponding to the number of columns for one scan, i.e., for one scan, thus completing printing of the second pass.

In step S808, image data for 64 lines (the 1st to 16th lines correspond to "0" data, the 17th to 32nd lines correspond to the image data used in the first pass, the 33rd to 48th lines correspond to the image data used in the second pass, and the 49th to 64th lines correspond to new image data) are transferred to the print buffer 130, and are then transferred to the P/S converter 102 via the data register 101. At this time, CCNT=3 is set in the counter 110a as the number of scans of the printing head IJH.

In step S810, the printing medium is fed from the printing position in the second pass in the sub-scanning direction by a width corresponding to the ¼ region of the nozzle array.

In step S812, printing in the third pass is performed. The ¼ nozzle region (corresponding to the image region D3 in FIG. 3A) prints "0" data. When the value of the counter 110a is CCNT=3, the selector 106a selects the mask pattern in the mask register A 105a, the selector 106b selects the mask pattern in the mask register B 105b, the selector 106c selects the mask pattern in the mask register C 105c, and the selector 106d selects a pattern of all "1"s.

More specifically, while the count value of the counter 104 ranges from 1 to 16, the selector 106d that selects the pattern of all "1"s is sequentially selected, and the AND gate 103 logically ANDs one bit of image data transferred from the P/S converter 102 and "1" input at its gate on the selector 107 side every time the counter 104 counts one bit. With this processing, image data having a pattern of "0"s are sequentially transferred to the printing head IJH.

On the other hand, while the count value of the counter 104 ranges from 17 to 32, the selector 107 selects the selector 106c. More specifically, the selector 107 selects the mask pattern in the mask register C 105c, and outputs it to the AND gate 103. With this processing, the next ¼ nozzle region (corresponding to the image region C3 in FIG. 3A) is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Furthermore, while the count value of the counter 104 ranges from 33 to 48, the selector 107 selects the selector 106b. More specifically, the selector 107 selects the mask pattern in the mask register B 105b, and outputs it to the AND gate 103. With this processing, the remaining ¼ nozzle region (corresponding to the image region B3 in FIG. 3A) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Moreover, while the count value of the counter 104 ranges from 49 to 64, the selector 107 selects the selector 106a. More specifically, the selector 107 selects the mask pattern in the mask register A 105a, and outputs it to the AND gate 103. With this processing, the remaining ¼ nozzle region (corresponding to the image region A3 in FIG. 3A) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH. As a consequence, the image data required for printing an image for one column by the printing head IJH are stored in the printing head IJH, and printing is executed. On the other hand, the column counter 111 increments its contents by 1. By repeating this operation for one scan, printing in the third pass is completed.

In step S812, image data for 64 lines (the 1st to 16th lines correspond to the image data used in the first pass, the 17th to 32nd lines correspond to the image data used in the second pass, the 33rd to 48th lines correspond to the image data used in the third pass, and the 49th to 64th lines correspond to new image data) are transferred to the print buffer 130, and are then transferred to the P/S converter 102 via the data register 101. At this time, CCNT=4 is set in the counter 110a as the number of scans of the printing head IJH.

In step S816, the printing medium is fed from the printing position in the third pass in the sub-scanning direction by a width corresponding to the ¼ region of the nozzle array.

In step S818, printing in the fourth pass is performed. When the value of the counter 110a is CCNT=4, the selector 106a selects the mask pattern in the mask register A 105a, the selector 106b selects the mask pattern in the mask register B 105b, the selector 106c selects the mask pattern in the mask register C 105c, and the selector 106d selects the mask pattern in the mask register D 105d. While the count value of the counter 104 ranges from 1 to 16, the selector 107 selects the selector 106d. More specifically, the selector 107 selects the mask pattern in the mask register D 105d, and outputs it to the AND gate 103.

With this processing, the ¼ nozzle region (corresponding to the image region D4 in FIG. 3A) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

On the other hand, while the count value of the counter 104 ranges from 17 to 32, the selector 107 selects the selector 106c. More specifically, the selector 107 selects the mask pattern in the mask register C 105c, and outputs it to the AND gate 103. With this processing, the ¼ nozzle region (corresponding to the image region C4 in FIG. 3A) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Furthermore, while the count value of the counter 104 ranges from 33 to 48, the selector 107 selects the selector 106b. More specifically, the selector 107 selects the mask pattern in the mask register B 105b, and outputs it to the AND gate 103. With this processing, the next ¼ nozzle region (corresponding to the image region B4 in FIG. 3A) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Moreover, while the count value of the counter 104 ranges from 49 to 64, the selector 107 selects the selector 106a. More specifically, the selector 107 selects the mask pattern in the mask register A 105a, and outputs it to the AND gate 103. With this processing, the remaining ¼ nozzle region (corresponding to the image region A4 in FIG. 3A) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH. As a consequence, the image data required for printing an image for one column by the printing head IJH are stored in the printing head IJH, and printing is executed. On the other hand, the column counter 111 increments its contents by 1. By repeating this operation for one scan, printing in the fourth pass is completed.

Figure 6:
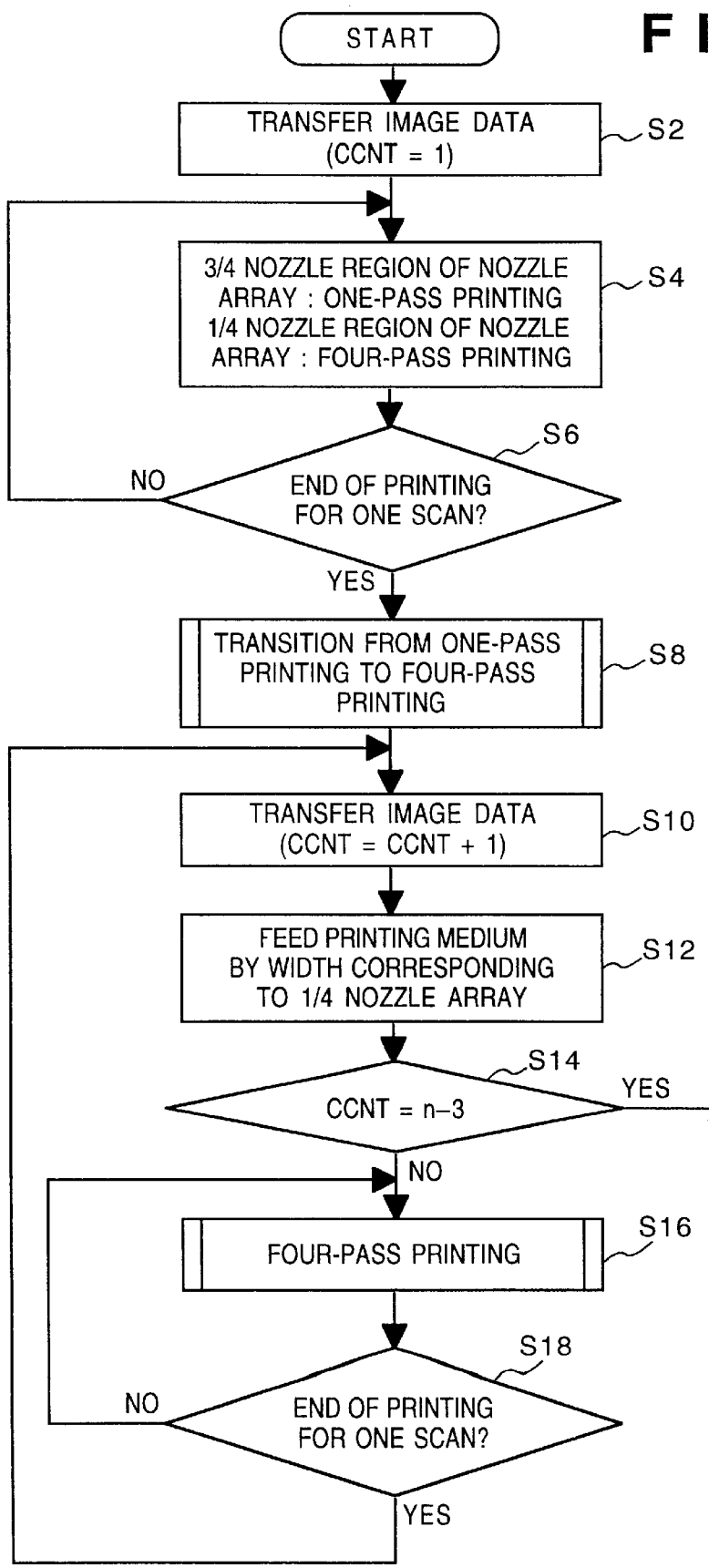
FIG. 6 is a flow chart showing the processing flow of the embodiment of the present invention.
Figure 7:
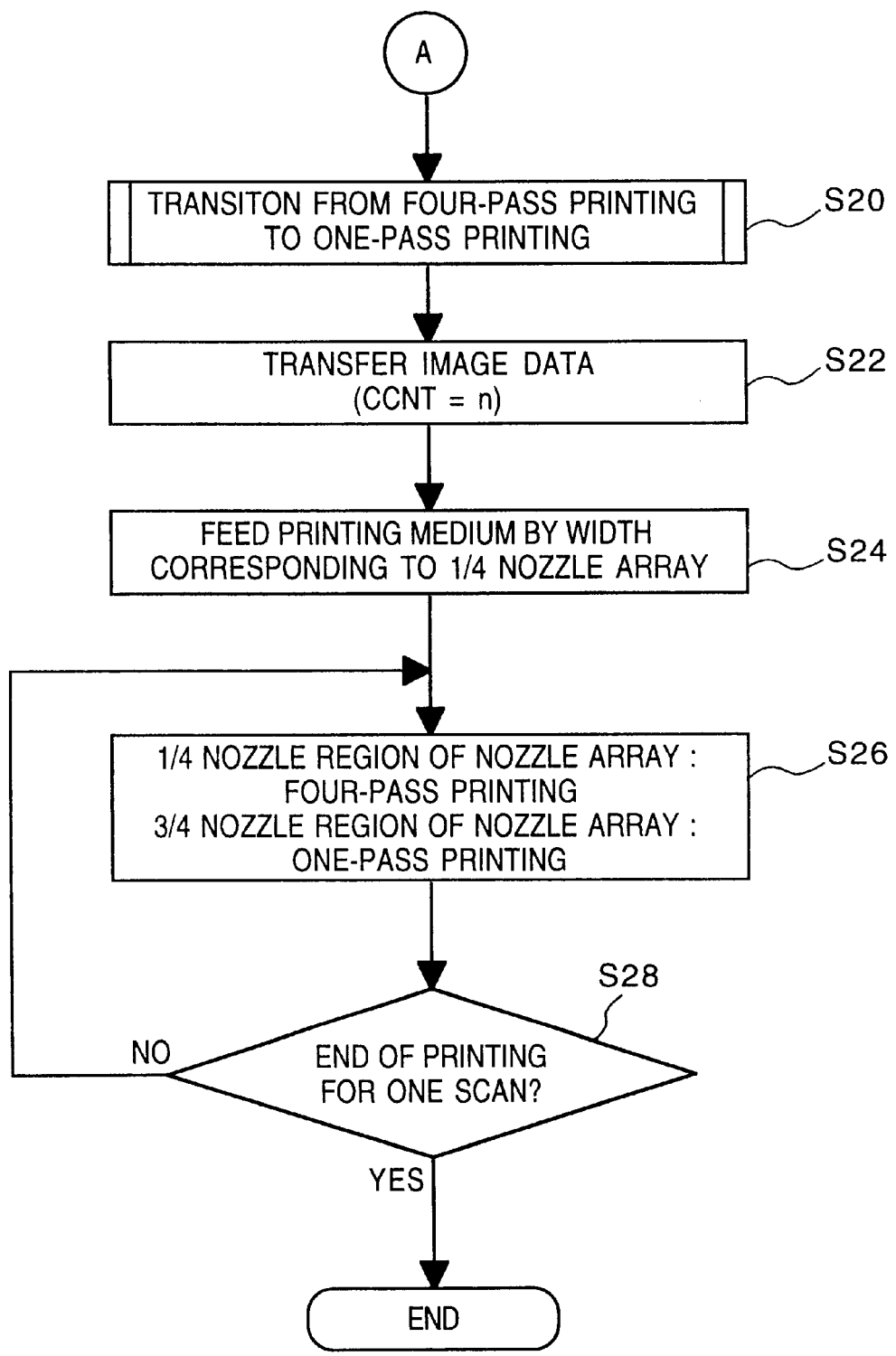
FIG. 7 is a flow chart showing the processing flow of the embodiment of the present invention.

Referring back to the flow chart shown in FIG. 6, printing upon transition from one-pass printing to four-pass printing is completed.

In step S10, image data for 64 lines are transferred to the print buffer 130, and are then transferred to the P/S converter 102 via the data register 101. At this time, CCNT=5 is set in the counter 110a as the number of scans of the printing head IJH. Every time printing for one scan is completed, the count value of the counter ll0a is incremented by 1.

In step S12, the printing medium is fed from the printing position in the fourth pass in the sub-scanning direction by a width corresponding to the ¼ region of the nozzle array.

It is checked in step S14 if the count value of the counter 110a is CCNT=n−3. If the count value is CCNT=n−3 (YES in step S12), the flow advances to step S20 in FIG. 7; if the count value is not CCNT=n−3 (NO in step S12), the flow advances to step S16.

If the count value is not CCNT=n−3, four-pass printing is performed in step S16 by the same processing as that described in step S816 in FIG. 8. It is checked in step S18 if printing for one scan is completed. If it is determined that printing is completed (YES in step S18), the printing head IJH returns to its home position; otherwise, the flow returns to step S10.

If the count value is CCNT=n−3, transition from the four-pass printing mode to the one-pass printing mode is performed in step S20. The processing at that time will be described in detail below with reference to the flow chart shown in FIG. 9.

Figure 9:
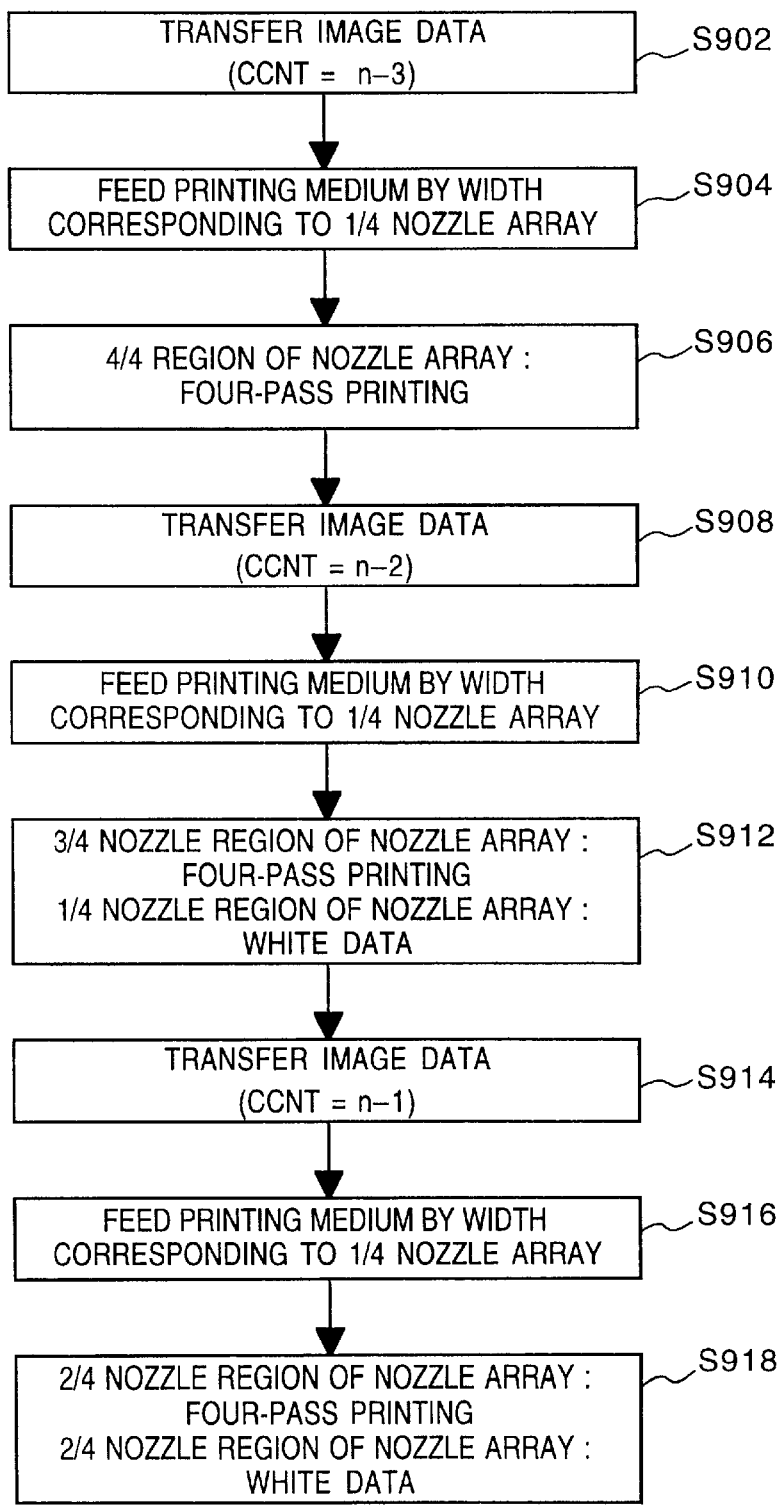
FIG. 9 is a flow chart showing the transition from the four-pass printing mode to the one-pass printing mode in the embodiment of the present invention.

FIG. 9 is a flow chart showing the processing flow upon transition from the four-pass printing mode to the one-pass printing mode.

In step S902, image data for 64 lines (the 1st to 16th lines correspond to the image data used in the (n-6)-th pass, the 17th to 32nd lines correspond to the image data used in the (n-5)-th pass, the 33rd to 48th lines correspond to the image data used in the (n-4)-th pass, and the 49th to 64th lines correspond to new image data) are transferred to the print buffer 130, and are then transferred to the P/S converter 102 via the data register 101. At this time, CCNT=n−3 is set in the counter 110a as the number of scans of the printing head IJH.

In step S904, the printing medium is fed from the printing position in the (n-4)-th pass in the subscanning direction by a width corresponding to the ¼ region of the nozzle array.

In step S906, printing in the (n-3)-th pass is performed. When the value of the counter 110a is CCNT=n−3, the selector 106a selects the mask pattern in the mask register A 105a, the selector 106b selects the mask pattern in the mask register B 105b, the selector 106c selects the mask pattern in the mask register C 105c, and the selector 106d selects the mask pattern in the mask register D 105d. While the count value of the counter 104 ranges from 1 to 16, the selector 107 selects the selector 106d.

More specifically, the selector 107 selects the mask pattern in the mask register D 105d, and outputs it to the AND gate 103. With this processing, the ¼ nozzle region (corresponding to the image region Dn-3 in FIG. 3B) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

On the other hand, while the count value of the counter 104 ranges from 17 to 32, the selector 107 selects the selector 106c. More specifically, the selector 107 selects the mask pattern in the mask register C 105c, and outputs it to the AND gate 103. With this processing, the ¼ nozzle region (corresponding to the image region Cn-3 in FIG. 3B) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Furthermore, while the count value of the counter 104 ranges from 33 to 48, the selector 107 selects the selector 106b. More specifically, the selector 107 selects the mask pattern in the mask register B 105b, and outputs it to the AND gate 103. With this processing, the next ¼ nozzle region (corresponding to the image region Bn-3 in FIG. 3B) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Moreover, while the count value of the counter 104 ranges from 49 to 64, the selector 107 selects the selector 106a. More specifically, the selector 107 selects the mask pattern in the mask register A 105a, and outputs it to the AND gate 103. With this processing, the remaining ¼ nozzle region (corresponding to the image region An-3 in FIG. 3B) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH. As a consequence, the image data required for printing an image for one column by the printing head IJH are stored in the printing head IJH, and printing is executed. On the other hand, the column counter 111 increments its contents by 1. By repeating this operation for one scan, printing in the (n-3)-th pass is completed.

In step S908, image data for 64 lines (the 1st to 16th lines correspond to the image data used in the (n-5)-th pass, the 17th to 32nd lines correspond to the image data used in the (n-4)-th pass, the 33rd to 48th lines correspond to the image data used in the (n-3)-th pass, and the 49th to 64th lines correspond to "0" data) are transferred to the print buffer 130, and are then transferred to the P/S converter 102 via the data register 101. At this time, CCNT=n−2 is set in the counter 110a as the number of scans of the printing head IJH.

In step S910, the printing medium is fed from the printing position in the (n-3)-th pass shown in FIG. 3B in the sub-scanning direction by a width corresponding to the ¼ region of the nozzle array.

In step S912, printing in the (n-2)-th pass is performed. When the value of the counter 110a is CCNT=n−2, the selector 106a selects a pattern of all "1"s, he selector 106b selects the mask pattern in the mask register B 105b, the selector 106c selects the mask attern in the mask register C 105c, and the selector 106d selects the mask pattern in the mask register D 105d. While the count value of the counter 104 ranges from 1 to 16, the selector 107 selects the selector 106d.

More specifically, the selector 107 selects the mask pattern in the mask register D 105d, and outputs it to the AND gate 103. With this processing, the ¼ nozzle region (corresponding to the image region Dn-2 in FIG. 3B) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

On the other hand, while the count value of the counter 104 ranges from 17 to 32, the selector 107 selects the selector 106c. More specifically, the selector 107 selects the mask pattern in the mask register C 105c, and outputs it to the AND gate 103. With this processing, the next ¼ nozzle region (corresponding to the image region Cn-2 in FIG. 3B) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Furthermore, while the count value of the counter 104 ranges from 33 to 48, the selector 107 selects the selector 106b. More specifically, the selector 107 selects the mask pattern in the mask register B 105b, and outputs it to the AND gate 103. With this processing, the next ¼ nozzle region (corresponding to the image region Bn-2 in FIG. 3B) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Moreover, while the count value of the counter 104 ranges from 49 to 64, the selector 106a that selects the pattern of all "1"s is selected, and the AND gate 103 logically ANDs one bit of image data transferred from the P/S converter 102 and the selected mask pattern, and "1" input at its gate on the selector 107 side every time the counter 104 counts one bit. With this processing, image data having a pattern of "0" are sequentially transferred o the printing head IJH. Hence, the remaining ¼ nozzle region (corresponding to the image region An-2 in FIG. 3B) prints "0" data. As a consequence, image data required for printing an image for one column by the printing head IJH are stored in the printing head IJH, and printing is executed. By repeating this operation for one scan, printing in the (n-2)-th pass is completed.

In step S914, image data for 64 lines (the 1st to 16th lines correspond to the image data used in the (n-4)-th pass, the 17th to 32nd lines correspond to the image data used in the (n-3)-th pass, and the 33rd to 64th lines correspond to "0" data) are transferred to the print buffer 130, and are then transferred to the P/S converter 102 via the data register 101. At this time, CCNT =n−1 is set in the counter 110a as the number of scans of the printing head IJH.

In step S916, the printing medium is fed from the printing position in the (n-2)-th pass shown in FIG. 3B in the sub-scanning direction by a width corresponding to the ¼ region of the nozzle array.

In step S918, printing in the (n-1)-th pass is performed. When the value of the counter 110a is CCNT=n−1, the selector 106a selects a pattern of all "1"s , the selector 106b selects a pattern of all "1"s, the selector 106c selects the mask pattern in the mask register C 105c, and the selector 106d selects the mask pattern in the mask register D 105d. While the count value of the counter 104 ranges from 1 to 16, the selector 107 selects the selector 106d. More specifically, the selector 107 selects the mask pattern in the mask register D 105d, and outputs it to the AND gate 103. With this processing, the ¼ nozzle region (corresponding to the image region Dn-1 in FIG. 3B) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

On the other hand, while the count value of the counter 104 ranges from 17 to 32, the selector 107 selects the selector 106c. More specifically, the selector 107 selects the mask pattern in the mask register C 105c, and outputs it to the AND gate 103. With this processing, the next ¼ nozzle region (corresponding to the image region Cn-1 in FIG. 3B) is also masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

Furthermore, while the count value of the counter 104 ranges from 33 to 64, the selector 106a that selects the pattern of all "1"s is selected, and the AND gate 103 logically ANDs one bit of image data transferred from the P/S converter 102 and the selected mask pattern, and "1" input at its gate on the selector 107 side. With this processing, image data having a pattern of "0" are sequentially transferred to the printing head IJH. Hence, the remaining 2/4 nozzle region (corresponding to the image regions Bn-1 and An-1 in FIG. 3B) prints "0" data. As a consequence, image data required for printing an image for one column by the printing head IJH are stored in the printing head IJH, and printing is executed. By repeating this operation for one scan, printing in the (n-1)-th pass is completed.

Upon completion of the transition from the four-pass printing mode to the one-pass printing mode, image data including footer information are recorded. Referring back to the flow chart in FIG. 7, in step S22, image data for 64 lines (the 1st to 16th lines correspond to image data used in the (n-3)-th pass, and the 17th to 64th lines correspond to footer information) are transferred to the print buffer 130, and are then transferred to the P/S converter 102 via the data register 101. At this time, CCNT=n is set in the counter 110a as the initial value of the number of scans of the printing head IJH.

In step S24, the printing medium is fed from the printing position in the (n-1)-th pass shown in FIG. 3B in the sub-scanning direction by a width corresponding to the 1/4 region of the nozzle array.

In step S26, printing in the n-th pass is performed. The 3/4 nozzle region (corresponding to the image regions Cn, Bn, and An in FIG. 3B) of the nozzle array of the printing head IJH prints footer information in the one-pass printing mode. In the selector 106, when the value of the counter 110a is CCNT=n, the selectors 106a to 106c select patterns of all "1"s, and the selector 106d selects the mask pattern in the mask register D 105d. While the count value of the counter 104 ranges from 1 to 16, the selector 107 selects the selector 106d. More specifically, the selector 107 selects the mask pattern in the mask register D 105d, and outputs it to the AND gate 103. With this processing, the 1/4 nozzle region (corresponding to the image region Dn in FIG. 3B) of the nozzle array is masked to attain the four-pass printing mode. More specifically, the AND gate 103 logically ANDs the respective bits of image data transferred from the P/S converter 102 and the selected mask pattern, and image data used in the four-pass printing mode are sequentially transferred to the printing head IJH.

On the other hand, while the count value of the counter 104 ranges from 17 to 64, the selectors 106c to 106a that select the patterns of all "1"s are sequentially selected, and always input "1" to the gate, on the selector 107 side, of the AND gate 103. Therefore, the AND gate 103 logically ANDs one bit of image data transferred from the P/S converter 102 and "1" input at its gate on the selector 107 side every time the counter 104 counts one bit. With this processing, image data used in the one-pass printing mode are sequentially transferred to the printing head IJH without being masked. As a consequence, image data required for printing an image for one column by the printing head IJH are stored in the printing head IJH, and printing is executed. By repeating this operation for one scan, printing in the n-th pass is completed.

It is checked in step S28 if printing in the n-th pass is completed. If it is determined that printing is completed (YES in step S28), the printing head IJH returns to its home position. On the other hand, if printing is not completed yet (NO in step S28), the flow returns to step S26.

As described above, according to this embodiment, in the printing apparatus that performs multi-pass printing, printing in which the four- and one-pass printing modes are respectively used on the first and last printing scan regions can be performed. With this processing, the effective printing range on the printing medium by the printing head can be broadened, and efficient printing with little printing time loss can be realized. Also, the printing head can operate efficiently.

Furthermore, since this embodiment does not require any complicated mechanism for holding the printing medium to assure a certain printable region or for keeping a certain distance between the printing medium and the printing head, the apparatus arrangement can be simplified.

This embodiment has exemplified the method that allows, in the first and last passes, printing of image data to be printed in accordance with one-pass printing in the nozzle region which is not used in the multi-pass printing mode. However, the present invention is not limited to this specific method. For example, in the second or third pass, image data used in one-pass printing may be printed in the nozzle region which is not used in the multi-pass printing mode.

Multi-pass printing may be performed while changing the number of passes required to complete printing. For example, in FIG. 3A, printing using the nozzle region corresponding to the image region D1 to be recorded in the first pass at the beginning of printing is performed in the one-pass printing mode, printing using the nozzle regions corresponding to the image region C1 to be printed in the first pass and the image region D2 to be printed in the second pass is performed in the two-pass printing mode, and printing using the nozzle regions corresponding to the image region B1 to be recorded in the first pass and the image region D3 to be printed in the third pass is performed in the three-pass printing mode.

In order to check the necessity of multi-pass printing, the printing apparatus may comprise an image region separation circuit for discriminating whether image data is a binary image or multi-value image, or an analysis unit for analyzing printing density information and code information such as a header/footer or the like. If it is determined in accordance with the separation or analysis result that, for example, multi-pass printing is necessary, multi-pass printing may be performed; otherwise (if image data is a binary image), one-pass printing may be performed.

With this arrangement, in the first and last passes, when printing using the nozzle region which is not used in the multi-pass printing operation is performed in the one-pass printing mode or by less than n passes if the number of passes to be recorded is n, losses in the printable region and the printing time can be prevented. This effect is more pronounced as the number of nozzles of the printing head increases and as the printing region in one scan becomes larger.

In this embodiment, a facsimile apparatus with a built-in printing unit has been exemplified. The present invention can also be applied to, e.g., a printer apparatus which comprises a function of recording a header or footer as information in addition to information to be printed.

The present invention has exemplified a printer apparatus, which comprises means (e.g., an electro-thermal conversion element, laser beam, and the like) for generating heat energy as energy utilized upon execution of ink ejection, and causes a change in state of ink by the heat energy, among the ink-jet printing systems. According to this system, a high-density, high-definition printing operation can be attained.

As the representative arrangement and principle of the ink-jet printing system, one practiced by use of the basic principle disclosed in, for example, U.S. Pat. Nos. 4,723,129 and 4,740,796 is preferred. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electro-thermal conversion elements arranged in correspondence with a sheet or liquid channels holding a liquid (ink), heat energy is generated by the electro-thermal conversion element to effect film boiling on the heat acting surface of the printing head, and consequently, a bubble can be formed in the liquid (ink) in one-to-one correspondence with the driving signal. By ejecting the liquid (ink) through an ejection port by growth and shrinkage of the bubble, at least one droplet is formed. If the driving signal is applied as a pulse signal, the growth and shrinkage of the bubble can be attained instantly and adequately to achieve ejection of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of ejection ports, liquid channels, and electro-thermal conversion elements (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Pat. Laid-Open No. 59-123670 which discloses the arrangement using a slit common to a plurality of electro-thermal conversion elements as an ejection portion of the electro-thermal conversion elements, or Japanese Pat. Laid-Open No. 59-138461 which discloses the arrangement having an opening for absorbing a pressure wave of heat energy in correspondence with an ejection portion.

Furthermore, as a full line type printing head having a length corresponding to the width of a maximum printing medium which can be printed by the printing apparatus, either the arrangement which satisfies the full-line length by combining a plurality of printing heads as disclosed in the above specification or the arrangement as a single printing head obtained by forming printing heads integrally can be used.

In addition, the present invention is effective for a case using an exchangeable chip type printing head which can be electrically connected to the apparatus main body or can receive an ink from the apparatus main body upon being mounted on the apparatus main body, or a cartridge type printing head in which an ink tank is integrally arranged on the printing head itself.

It is preferable to add recovery means for the printing head, preliminary auxiliary means, and the like provided as an arrangement of the printing apparatus of the present invention since the effect of the present invention can be further stabilized. Examples of such means include, for the printing head, capping means, cleaning means, pressurization or suction means, and preliminary heating means using electro-thermal conversion elements, another heating element, or a combination thereof. It is also effective for stable printing to execute a preliminary ejection mode which performs ejection independently of printing.

The present invention is effectively applicable not only to an apparatus having a printing mode of only principal color such as black, but also to an apparatus having at least one of a multi-color mode using different color inks and a full-color mode using the mixture of the colors.

Moreover, in the above-mentioned embodiment, ink is described as a liquid. Alternatively, the present invention may use even ink which is solid at room temperature or less and softens or liquefies at room temperature as long as ink liquefies upon application of a use printing signal. Alternatively, since it is a common practice in the ink-jet method to control the temperature of the ink itself within the range from 30° C. to 70° C. so that the ink viscosity falls within the stable ejection range, the ink need only liquefy upon application of the use printing signal.

In addition, in order to prevent a temperature rise caused by heat energy by positively utilizing it as energy for causing a change in state of the ink from a solid state to a liquid state, or to prevent evaporation of the ink, ink which is solid in a non-use state and liquefies upon heating may be used. In any case, the present invention can be applied to a case wherein ink which liquefies upon application of heat energy, such as ink which liquefies upon application of heat energy according to a printing signal and is ejected in a liquid state, ink which begins to solidify when it reaches a printing medium, or the like, is used. In this case, ink may oppose electro-thermal conversion elements while being held in a liquid or solid state in recess portions of a porous sheet or through holes, as described in Japanese Pat. Laid-Open No. 54-56847 or 60-71260. In the present invention, the above-mentioned film boiling system is most effective for the above-mentioned inks.

In the above embodiment, printing is performed by combining the one- and four-pass printing modes in all the printing modes. However, as shown in FIG. 1, the arrangement of the facsimile apparatus of this embodiment can have both the function of the facsimile apparatus (FAX) and that of the computer apparatus (PC) serving as an image output terminal via the interface unit (PC I/F unit) 14. In this case, the printing mode for printing image data received from another FAX (to be referred to as a FAX mode hereinafter) and the printing mode for printing image data output from the PC (to be referred to as a PC mode hereinafter) may be prepared, and an appropriate printing mode may be selected in correspondence with the type of image data output source apparatus, thus further obtaining the following effects.

When image data received from another FAX is to be printed, the transmitting facsimile apparatus cannot detect the printing method of the printing apparatus at the receiving side. On the other hand, the transmitting side may set a broad printing region of image data. In this case, the effect of the printing method that performs printing combining the one- and four-pass printing modes in this embodiment can be expected. On the other hand, when image data output from the PC is to be printed, since the printing region of image data can be changed by the PC side, the effect of improving the image quality is larger if only the four-pass printing mode is used. Therefore, in the FAX mode, printing is performed combining the one- and four-pass printing modes, and in the PC mode, the printing mode is automatically switched to the four-pass printing mode, thus realizing optimal printing corresponding to the type of output source apparatus without any load on the user.

The printing operation in this case will be described below with reference to the flow chart shown in FIG. 10.

Figure 10:
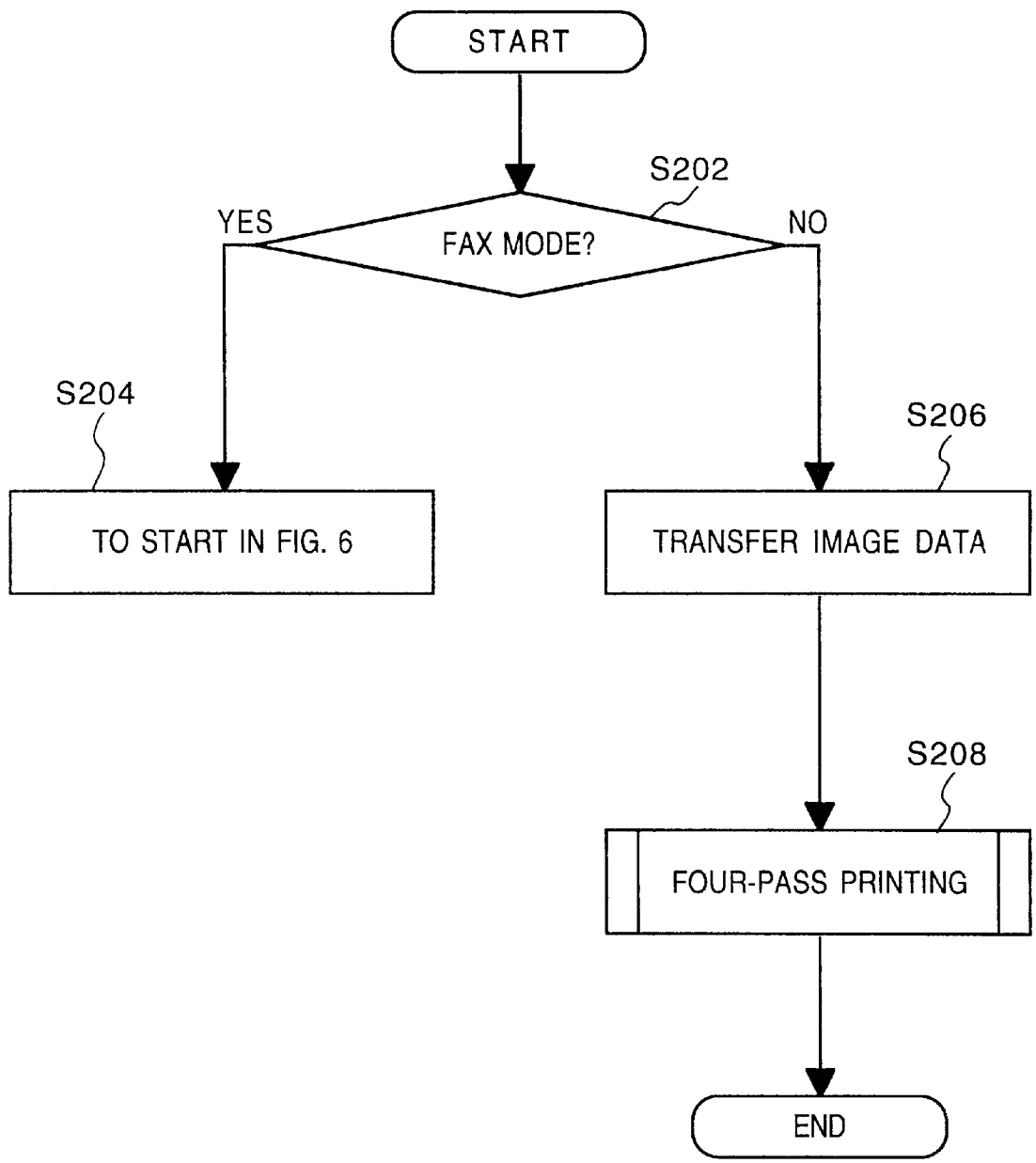
FIG. 10 is a flow chart showing the processing flow according to another embodiment of the present invention.

FIG. 10 is a flow chart showing the processing flow of another embodiment.

It is checked in step S202 based on image data input to the printing unit 6 if the printing mode to be executed is the FAX mode (i.e., image data is input via the MODEM 8 shown in FIG. 1) or the PC mode (i.e., image data is input via the PC I/F unit 14 shown in FIG. 1).

If the printing mode to be executed is the FAX mode, the flow advances to step S204, and the printing mode is switched to that combining the one- and four-pass printing modes. That is, the flow advances to "start" of the flow chart in FIG. 6.

On the other hand, if the printing mode to be executed is the PC mode, the flow advances to step S206, and image data is transferred to the printing head IJH.

In step S208, printing is performed in the abovementioned four-pass printing mode on the basis of the transferred image data.

Furthermore, as applications of the printing apparatus according to the present invention, it may be arranged integrally or separately as an image output terminal of an information processing apparatus such as a computer, or may be realized as a copying machine in combination with a reader or the like or as a facsimile apparatus having a transmission/reception function.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the program code read out by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing an image on a printing medium using a printing head having a printing element array with a predetermined width, comprising:

main scanning means for performing main scanning by relatively scanning said printing head with respect to the printing medium in a main scanning direction that is different from a direction in which said printing element array is arranged;

printing means for printing an image on the printing medium by enabling said printing head during the main scanning performed by said main scanning means;

sub scanning means for performing sub scanning by relatively scanning the printing medium in a sub scanning direction that is different from the main scanning direction; and control means for controlling said printing means, wherein said printing element array has a plurality of printing element groups, and said printing means completes printing of a printing region on the printing medium by main scanning a predetermined number times using different printing element groups of said plurality of printing element groups, wherein a plurality of printing regions arranged in the sub scanning direction on the printing medium are printed in a first or last main scan of the printing head, and the main scanning for printing at least one of the plurality of printing regions is performed by a smaller number of times than the predetermined number of times, wherein a remaining printing region of the plurality of printing regions on the printing medium is printed by performing main scanning for printing the predetermined number of times.

2. The apparatus according to claim 1, wherein said printing element array of said printing head is divided into n (n≧2) printing element groups, and said control means controls said printing means so that at least one of the divided printing element groups completes printing by one scan of said printing head upon printing on the printing medium in the first or last scan of said printing head.

3. The apparatus according to claim 1, further comprising:

input means for inputting image data from an external device;

analysis means for analyzing the image data; and determination means for determining on the basis of an analysis result of said analysis means whether printing of said printing means is to be completed by one scan or a plurality of scans of said printing head, wherein said control means controls printing of said printing means on the basis of a determination result of said determination means.

4. The apparatus according to claim 3, wherein said analysis means analyzes a printing density of the image rag data or whether or not the image data is binary data or multi-value data.

5. The apparatus according to claim 1, wherein said control means includes count means for counting the number of scans after said printing head starts printing on the printing medium.

6. The apparatus according to claim 1, wherein said printing head is a printing head for ejecting ink by utilizing heat energy, and comprises a heat energy conversion member for generating heat energy to be applied to the ink.

7. A facsimile apparatus which comprises a printing apparatus of claim 1, comprising:
communication means for transmitting/receiving image data onto/from a communication line;
generation means for generating additional information to be added to the printing medium upon outputting the received image data; and
transfer means for transferring the additional information to said printing head so as to print the additional information in the first or last scan of the printing operation on the printing medium by said printing head.

8. The apparatus according to claim 7, wherein the additional information includes a reception time of the received image data or a predetermined mark.

9. A printing apparatus which is connected to a plurality of external apparatuses and print an image on a printing medium on the basis of image data input from one of said plurality of external apparatuses, comprising:
main scanning means for performing main scanning by relatively scanning a printing head, having a printing element array with a predetermined width, with respect to the printing medium in a main scanning direct ion that is different from a direction in which the printing element array is arranged;
printing means for printing an image on the printing medium by enabling said printing head during the main scanning performed by said main scanning means;
sub-scanning means for performing sub scanning by relatively scanning the printing medium in a sub scanning direction that is different from the main scanning direction;
discrimination means for discriminating the external apparatus as a source of the input image data; and
control means for controlling said printing means on the basis of a discrimination result of said discrimination means, wherein said printing element array has a plurality of printing element groups, and said printing means completes printing of a printing region on the printing medium by main scanning the printing head a predetermined number of times using different printing element groups of the plurality of printing element groups, wherein a plurality of printing regions arranged in the sub scanning direction on the printing medium are printed in a first or last main scan of the printing head, and a number of main scannings for printing at least one of the plurality of printing regions is a smaller number than the predetermined number,
wherein a remaining printing region of the plurality of printing regions on the printing medium is printed by preforming main scanning for printing the predetermined number of times.

10. The apparatus according to claim 9, wherein said plurality of external apparatuses include at least a facsimile apparatus, and a computer apparatus serving as an image output apparatus, and
when said discrimination means determines that the source of the input image data is the facsimile apparatus, control of said control means is executed, and when said discrimination means determines that the source of the input image data is the computer apparatus, the control of said control means is not executed.

11. The apparatus according to claim 9, wherein said printing element array of said printing head is divided into n (n≧2) printing element groups, and
said control means controls said printing means so that at least one of the divided printing element groups completes printing by one scan of said printing head upon printing on the printing medium in the first or last scan of said printing head.

12. The apparatus according to claim 9, further comprising:
analysis means for analyzing the image data; and
determination means for determining on the basis of an analysis result of said analysis means whether printing of said printing means is to be completed by one scan or a plurality of scans of said printing head,
wherein said control means controls printing of said printing means on the basis of a determination result of said determination means.

13. A control method for a printing apparatus for printing an image on a printing medium using a printing head having a printing element array with a predetermined width, comprising:
a main scanning step of performing main scanning by relatively scanning the printing head with respect to the printing medium in a main scanning direction that is different from a direction in which the printing element array is arranged;
a printing step of printing an image on the printing medium by enabling the printing head during the main scanning performed in said main scanning step; and
a sub scanning step of performing sub scanning by relatively scanning the printing medium in a sub scanning direction that is different from the main scanning direction, wherein the printing element array has a plurality of printing element groups, and during the main scanning performed in said main scanning step, printing of a printing region on the printing medium is completed in said printing step by main scanning a predetermined number times using different printing element groups of the plurality of printing element groups, and a plurality of printing regions arranged in the sub scanning direction on the printing medium are printed in a first or last main scan of the printing head, and a number of main scannings for printing at least one of the plurality of printing regions is a smaller number than the predetermined number,
wherein a remaining printing region of the plurality of printing regions on the printing medium is printed by performing the main scanning for printing the predetermined number of times.

14. The method according to claim 13, wherein said printing element array of said printing head is divided into n (n≧2) printing element groups, and
the printing step is controlled so that at least one of the divided printing element groups completes printing by one scan of said printing head upon printing on the printing medium in the first or last scan of said printing head.

15. The method according to claim 13, further comprising:
an input step of inputting image data from an external device;
an analysis step of analyzing the image data; and
a determination step of determining on the basis of an analysis result in the analysis step whether printing in the printing step is to be completed by one scan or a plurality of scans of said printing head,
wherein printing is controlled in the printing step on the basis of a determination result in the determination step.

16. The method according to claim 15, wherein the analysis step analyzes a printing density of the image data or whether or not the image data is binary data or multi-value data.

17. The method according to claim 13, further comprising the count step of counting the number of scans after said printing head starts printing on the printing medium.

18. The method according to claim 13, wherein said printing head is a printing head for ejecting ink by utilizing heat energy, and comprises a heat energy conversion member for generating heat energy to be applied to the ink.

19. A control method for a printing apparatus which is connected to a plurality of external apparatuses and prints an image on a printing medium on the basis of image data input from one of said plurality of external apparatuses, comprising:

a main scanning step of performing main scanning by relatively scanning a printing head, having a printing element array, on the printing medium in a main scanning direction that is different from a direction in which the printing element array is arranged;

a printing step of printing an image on the printing medium by enabling the printing head during the main scanning performed in said main scanning step;

a sub scanning step of performing sub scanning by relatively scanning the printing medium in a sub scanning direction that is different from the main scanning direction, wherein the printing element array has a plurality of printing element groups, and during the main scanning performed in said main scanning step, printing control is executed in that printing of a printing region on the printing medium is completed in said printing step by main scanning a predetermined number times using different printing element groups of the plurality of printing element groups, wherein when the external apparatus is a source of the input image data, a plurality of printing regions arranged in the sub scanning direction on the printing medium are scanned in a first or last main scan of the printing head, and a number of main scannings for printing at least one of the plurality of printing regions is a smaller number than the predetermined number, wherein a remaining printing region of the plurality of printing regions on the printing medium is printed by performing main scanning for printing the predetermined number of times.

20. The method according to claim 19, wherein said plurality of external apparatuses include at least a facsimile apparatus, and a computer apparatus serving as an image output apparatus, and when it is determined that the source of the input image data is the facsimile apparatus, the printing control is executed, and when it is determined that the source of the input image data is the computer apparatus, the printing control is not executed.

21. The method according to claim 19, wherein said printing element array of said printing head is divided into n (n≧2) printing element groups, and the printing step is controlled so that at least one of the divided printing element groups completes printing by one scan of said printing head upon printing on the printing medium in the first or last scan of said printing head.

22. The method according to claim 19, further comprising:

an analysis step of analyzing the image data; and a determination step of determining on the basis of an analysis result in the analysis step whether printing in the printing step is to be completed by one scan or a plurality of scans of said printing head, wherein printing in the printing step is controlled on the basis of a determination result in the determination step.

\* \* \* \* \*

UNITED STATES PATENT AND TRADEMARK OFFICE
CERTIFICATE OF CORRECTION

PATENT NO.    : 6,168,320 B1
DATED         : January 2, 2001
INVENTOR(S)   : Ono et al.

It is certified that error appears in the above-identified patent and that said Letters Patent is hereby corrected as shown below:

Column 13,
Line 59, "11Oa" should read -- 110a --.

Column 15,
Line 39, "he" should read -- the --.

Column 22,
Line 24, "number" should read -- number of --.
Line 29, "the main scanning" should read -- a number of main scannings --.
Line 31, "performed by" and "of times" should be deleted.
Line 32, "number of times," should read -- number, --.

Column 23,
Line 18, "print" should read -- prints --.
Line 24, "direct ion" should read -- direction --.
Line 30, "sub-scanning" should read -- sub scanning --.

Signed and Sealed this

Ninth Day of April, 2002

Attest:

*Attesting Officer*

JAMES E. ROGAN
*Director of the United States Patent and Trademark Office*